United States Patent [19]

Maxwell et al.

[11] Patent Number: 4,976,847

[45] Date of Patent: Dec. 11, 1990

[54] PROCESS FOR THE CATALYTIC CRACKING OF A HYDROCARBON FEEDSTOCK

[75] Inventors: Ian E. Maxwell; Jaydeep Biswass, both of Amsterdam, Netherlands

[73] Assignee: Shell Oil Company, Houston, Tex.

[21] Appl. No.: 398,026

[22] Filed: Aug. 24, 1989

[30] Foreign Application Priority Data

Aug. 26, 1988 [GB] United Kingdom ............... 8820358

[51] Int. Cl.$^5$ ............................................. C10G 11/05
[52] U.S. Cl. .................................... 208/120; 208/111; 208/113; 208/121; 208/106
[58] Field of Search ............ 502/67, 111 MC, 120 MC

[56] References Cited

U.S. PATENT DOCUMENTS

| 3,755,145 | 8/1973 | Orkin ............................ 208/111 MC |
|---|---|---|
| 3,758,402 | 9/1973 | Oleck et al. ............................ 502/67 |
| 3,758,403 | 9/1973 | Rosinski et al. ..................... 208/120 |
| 3,769,202 | 10/1973 | Plank et al. .......................... 208/111 |
| 3,847,793 | 11/1974 | Schwartz et al. ............. 208/120 MC |
| 3,849,291 | 11/1974 | Owen .......................... 208/120 MC |
| 3,886,060 | 5/1975 | Owen .......................... 208/120 MC |
| 3,894,940 | 7/1975 | Scherzer et al. ....................... 502/67 |
| 4,100,218 | 7/1978 | Chen et al. ........................... 260/673 |
| 4,239,654 | 12/1980 | Gladrow et al. ............. 208/120 MC |
| 4,309,279 | 1/1982 | Chester et al. ........................ 502/67 |
| 4,309,280 | 1/1982 | Rosinski ....................... 208/120 MC |
| 4,350,614 | 9/1982 | Schwartz ............................ 252/455 |
| 4,368,114 | 1/1983 | Chester et al. .............. 208/120 MC |
| 4,522,705 | 6/1985 | Chu et al. ..................... 208/120 MC |
| 4,699,708 | 10/1987 | Desseau ................................ 208/111 |
| 4,818,738 | 4/1984 | Chu et al. ............................... 502/67 |
| 4,865,718 | 9/1984 | Herbst et al. ......................... 502/67 |

FOREIGN PATENT DOCUMENTS

| 0021787 | 1/1981 | European Pat. Off. . |
|---|---|---|
| 131986 | 6/1984 | European Pat. Off. . |
| 1058189 | 6/1964 | United Kingdom . |
| 1486927 | 11/1974 | United Kingdom . |
| 1481563 | 8/1977 | United Kingdom . |

*Primary Examiner*—Helane E. Myers

[57] ABSTRACT

Process for the catalytic cracking of a hydrocarbon feedstock, comprising contacting the feedstock with a catalyst composition comprising a zeolite I having a pore diameter larger than 0.7 nm and a zeolite II having a pore diameter smaller than 0.7 nm, which composition further comprises a dehydrogenating metal or metal component, at catalytic cracking conditions.

14 Claims, No Drawings

PROCESS FOR THE CATALYTIC CRACKING OF A HYDROCARBON FEEDSTOCK

FIELD OF THE INVENTION

The present invention relates to a process for the catalytic cracking of a hydrocarbon feedstock by contacting the feedstock with a suitable catalyst composition at catalytic cracking conditions.

BACKGROUND OF THE INVENTION

Catalytic cracking is a refining process which is applied commercially on a large scale. In this process heavy hydrocarbon fractions are converted into lighter and less viscous products. The conversion or cracking takes mainly place in the vapor phase in the presence of a catalyst. The feedstock is so converted into e.g. gasoline. Part of the feedstock is converted into gas consisting of four or less carbon atoms per molecule. The gas partly consists of olefins and partly of saturated hydrocarbons.

During the cracking reactions some heavy material, known as coke, is deposited onto the catalyst. This reduces its catalytic activity and regeneration is desired. Regeneration is accomplished by burning off the coke and then the catalyst activity is restored. Therefore, three steps can be distinguished in the process, viz. a cracking step in which the hydrocarbons are converted into lighter products, a stripping step to remove hydrocarbons adsorbed on the catalyst and a regeneration step to burn off coke from the catalyst. The regenerated catalyst is then reused in the cracking step.

As catalysts for catalytic cracking zeolites in an amorphous matrix have been found to be very effective. In particular zeolites having relatively large pores, i.e. having pore diameters larger that 0.7 nm, are very suitable. From No. EP-B-0,131,986 catalyst compositions are known comprising a zeolite I with large pores and a zeolite II, being a ZSM-5-type zeolite, with a pore diameter of smaller than 0.7 nm. Similar catalyst. compositions are also known from U.S. Pat. No. 3,758,403.

As stated hereinbefore, part of the feedstock that has been cracked has been converted into a gaseous fraction Part of this gaseous fraction is saturated and has a relatively low intrinsic value. It would therefore be advantageous if one could amend the process and/or catalyst such that hardly any saturated gaseous compound be formed. Surprisingly, it has now been found that the yield of saturated gaseous components is reduced if the catalyst composition further contains a dehydrogenating metal or metal component.

SUMMARY OF THE INVENTION

Accordingly, the invention provides a process for the catalytic cracking of a hydrocarbon feedstock, comprising contacting the feedstock with a catalyst composition comprising a zeolite I having a pore diameter larger than 0.7 nm and a zeolite II having a pore diameter smaller than 0.7 nm, which composition further comprises a dehydrogenating metal or metal component, at catalytic cracking conditions.

The surprising nature of the present invention is illustrated by U.S. Pat. No. -A-4,100,218, which describes a process for the preparation of LPG (saturated $C_{3-4}$-hydrocarbons) and gasoline starting from an olefinic stream, using a zeolitic catalyst having a pore diameter of less than 0.7 nm, which catalyst may contain a metal component, e.g. a dehydrogenating Group VIII metal. Since it was known that zeolites, hereinabove indicated as zeolite II, have activity to promote the conversion of olefins to saturated gaseous hydrocarbons, it is surprising that according to the present invention olefinic gaseous hydrocarbons are formed.

DETAILED DESCRIPTION OF THE INVENTION

The dehydrogenating metal or metal component is present on the zeolitic catalyst composition. It is possible to distribute the dehydrogenating metal (component) over both zeolites. In the latter case the dehydrogenating activity is effected on the complete feedstock. It is believed that when the dehydrogenating metal (component) is present only on the zeolite II, the dehydrogenating activity is effected only on those molecules which can enter the pores of the zeolite II. Basically that means that only linear and/or small molecules will be subjected to the dehydrogenating activity of the metal. Since one of the objects of the invention is to convert linear and/or small molecules into small olefins, the case that only zeolite II comprises a dehydrogenating metal is preferred.

The amount of the dehydrogenating metal or metal component may vary within wide ranges. Very small amounts, i.e. in the ppm range, show a dehydrogenating activity which is too low for commercial practice. Therefore, the amount of dehydrogenating metal (component) is preferably from 0.5 to 20% wt, calculated as metal and based on zeolite II.

The dehydrogenating metal that can be used can be selected from many metals. Suitable metals include those of Group II($b$), in particular zinc, and of Group III($a$), in particular gallium. It is however preferred to select a Group VIII and/or a Group VI($b$) metal or metal component. More preferably, the metal is selected from the group consisting of platinum, palladium, nickel, cobalt, molybdenum, tungsten and mixtures thereof, since these metals are well-known to show dehydrogenating activity. When one of the noble metals is used, e.g. platinum or palladium, the Group VIII metal is preferably present in the metallic form. When a non-noble metal is employed, e.g. nickel and/or cobalt and/or molybdenum and/or tungsten, the dehydrogenating metal is preferably used in its oxidic, sulphidic or metallic form.

The weight percentage of zeolite I to the sum of zeolites I and II may vary. Suitably the percentage amounts from 0.1 to 30% wt, more preferably, the weight percentage of zeolite I to the sum of zeolites I and II ranges from 1 to 10% wt.

The catalyst composition used in the present process comprises two zeolites. In one embodiment of the present invention the catalyst composition includes a physical mixture of at least two cracking components, one comprising a zeolite I and another comprising a zeolite II. In this embodiment the composition comprises a mixture of catalyst particles that contain only one of both zeolites. It will be clear to the man skilled in the art that the catalyst particles may further comprise a matrix material, such as an refractory oxide, e.g. silica, alumina, silica-alumina, magnesia, thoria, titania, zirconia and the like. In another embodiment of the present invention, which is preferred, the catalyst composition comprises an intimate mixture of the zeolites I and II in a porous matrix material. That implies that a catalyst particle contains both zeolites.

Zeolite I has a pore diameter greater than 0.7 nm. The pore diameters of suitable zeolites I can be as large as 1.2 nm. Suitable zeolites I include the faujasite-type zeolites and zeolite L. Faujasite-type zeolites, including zeolites X and Y, are preferred., in particular zeolite Y is preferred. The zeolite can be in its acidic form, i.e. the form in which the zeolite hardly contains any alkali metal ions. It is also possible to load the zeolite with a dehydrogenating metal as described hereinabove. Preferably the zeolite I comprises rare earth metals. The latter metals may have been incorporated onto the zeolite by any conventional method. In particular ion-exchange is a very suitable method.

The zeolite II has a pore diameter smaller than 0.7 nm. The pore diameter can be as low as 0.4 nm. Suitable zeolites II include crystalline silica (silicalite), silicoaluminophosphates (SAPO), chromosilicates, gallium silicates, iron silicates, aluminium phosphates (ALPO), titanium aluminosilicates (TASO), boron silicates, titanium aluminophosphates (TAPO) and iron aluminosilicates. Examples of zeolites II that may be used in the process of the invention and that have a pore diameter of 0.4 to 0.7 nm, include SAPO-4 and SAPO-11, which are described in U.S. Pat. No. 4,440,871 incorporated by reference herein ALPO-11, described in U.S. Pat. No. 4,310,440 incorporated by reference herein, TAPO-11, described in U.S. Pat. No. 4,500,651 incorporated by reference herein, TASO-45, described in European Patent No. 229,295 incorporated by reference herein, boron silicates, described in e.g. U.S. Pat. No. 4,254,297 incorporated by reference herein, aluminium silicates like erionite, ferrierite, theta and the ZSM-type zeolites such as ZSM-5, ZSM-11, ZSM-12, ZSM-35, ZSM-23, and ZSM-38. Preferably the zeolite is selected from the group consisting of crystalline metal silicates having a ZSM-5 structure, ferrierite, erionite and mixtures thereof Suitable examples of crystalline metal silicates with ZSM-5 structure are aluminium, gallium, iron, scandium, rhodium and/or chromium silicates as described in e.g. No. GB-B-2,110,559 incorporated by reference herein. The pore diameters of these silicates are in the range of 0.5–0.6 nm.

The zeolite II is preferably not in its acidic form. This can be accomplished by having the dehydrogenating metal (components) occupy the potentially acidic sites. It is also possible to allow the zeolite II to be in its alkali metal form. By avoiding the presence of a great number of acidic sites on zeolite II the risk of overcracking of relatively small molecules is reduced.

The preparation of the catalyst composition used in the process according to the present invention can be done by any conventional method, such as ion-exchange, (co)precipitation, impregnation, (co)mulling etc. A suitable method is to prepare a zeolite II containing a dehydrogenating metal component via one or more conventional methods and incorporating this loaded zeolite together with a matrix material and a zeolite II into catalyst particles.

The process is carried out under catalytic cracking conditions. This implies that the process is advantageously carried out in the absence of added hydrogen. Preferably the process is carried out in an upwardly or downwardly moving catalyst bed. Suitably the process is carried out in the manner of conventional Thermofor Catalytic Cracking (TCC) or Fluidised Catalytic Cracking (FCC) processes. The process conditions are preferably a temperature of 400° to 650° C., in particular 450° to 600° C., a pressure of 1 to 10 bar, in particular 1 to 7.5 bar, a weight hourly space velocity of 1 to 250 kg/kg.h, in particular 5 to 150 kg/kg.h and a catalyst composition/feedstock weight ratio of 1 to 25, in particular 1.5 to 20.

The feedstock that can be used in the present process includes conventional catalytic cracking feedstocks, such as (vacuum) gas oils, deasphalted residual oils, and long or short residues. Generally, conventional feedstocks comprise hydrocarbons having a boiling point of at least 330° C. An advantage of the present invention resides in the possibility to include in the feedstock additionally hydrocarbons having from 2 to 5 carbon atoms. These small molecules will be dehydrogenated to yield valuable olefins. Therefore, the present process is advantageously carried out with a hydrocarbon feedstock comprising hydrocarbons with a boiling point of at least 330° C. and hydrocarbons having from 2 to 5 carbon atoms. The feedstock may consist of a mixture of gaseous ($C_{2-5}$) hydrocarbons, naphtha, kerosine, gasoil, vacuum distillates and vacuum residual fractions. Preferably, the feedstock consists of a mixture of a conventional catalytic cracking feedstock as defined hereinabove and a gaseous stream of $C_{2-5}$ hydrocarbons. The amount of hydrocarbons with 2 to 5 carbon atoms in the feedstock is preferably from 1 to 20% wt, based on the weight of the hydrocarbons with a boiling point of at least 330° C. and the hydrocarbons having from 2 to 5 carbon atoms.

The hydrocarbons having 2 to 5 carbon atoms in the molecule may accrue from a variety of sources. Suitable sources include straight run LPG, gaseous products from hydrotreatment and/or hydrocracking processes, waste streams from alkylation processes or catalytic dewaxing processes and the like. The hydrocarbons with 2 to 5 carbon atoms preferably comprise an LPG fraction, i.e. propane and/or butanes.

Preferably, the hydrocarbons having 2 to 5 carbon atoms in the molecule at least partly originate from a recycle stream obtained in the present process. In the present process olefins are formed, but an amount of saturated compounds remain unconverted. After separation of the unconverted hydrocarbons these are conveniently recycled to the present process.

We claim:

1. A process for the catalytic cracking of a hydrocarbon feedstock in the absence of added hydrogen, comprising contacting the feedstock with a catalyst composition comprising a zeolite I having a pore diameter larger than 0.7 and selected from zeolite Y, and a zeolite II having a pore diameter smaller than 0.7 nm and selected from a zeolite having a ZSM-5 structure, ferrierite, erionite and mixtures thereof, which composition comprises a dehydrogenating metal or metal component in an amount of from 0.5 to 20% wt based on zeolite II, at catalytic cracking conditions.

2. The process according to claim 1, in which only zeolite II comprises the dehydrogenating metal or metal component.

3. The process according to any one of claims 1 to 2, in which the dehydrogenating metal has been selected from a Group VI(b) and/or a Group VIII metal.

4. The process according to claim 3, in which the metal has been selected from the group consisting of platinum, palladium, nickel, cobalt, iron, tungsten, molybdenum and mixtures thereof.

5. The process according to claim 1 in which in the catalyst composition the weight percentage of zeolite I to the sum of zeolites I and II ranges from 0.1 to 30% wt.

6. The process according to claim 1 in which the catalyst composition includes a physical mixture of catalyst particles containing zeolite I and catalyst particles containing zeolite II.

7. The process according to claim 1 in which the catalyst composition comprises an intimate mixture of the zeolites I and II in a porous matrix.

8. The process according to claim 1 in which the zeolite Y contains rare earth metals.

9. The process according to claim 1 in which zeolite II is substantially in its alkali metal form.

10. The process according to claim 1 which is carried out in an upwardly or downwardly moving catalyst bed.

11. The process according to claim 1 which is carried out at a temperature of 250° to 650° C., a pressure of 1 to 10 bar, a space velocity of 1 to 250 kg/kg.h and a catalyst composition/feedstock weight ratio of 1 to 25.

12. The process according to claim 1 which the hydrocarbon feedstock comprises hydrocarbons having a boiling point of at least 330° C., and hydrocarbons having from 2 to 5 carbon atoms.

13. The process according to claim 12, in which the amount of hydrocarbons with 2 to 5 carbon atoms in the feed is from 1 to 20% wt, based on the weight of hydrocarbons with a boiling point of at least 330° C. and the hydrocarbons with 2 to 5 carbon atoms.

14. A process for the catalytic cracking of a hydrocarbon feedstock in the absence of added hydrogen, comprising contacting the feedstock at a temperature of about 250°–650° C., a pressure of about 1–10 bar and a space velocity of about 1–250 kg/kg.h with a catalyst composition comprising a zeolite I having a pore diameter larger than 0.7 nm and selected from a zeolite Y, a zeolite II having a pore diameter smaller than about 0.7 nm and selected from crystalline metal silicates having a ZSM-5 structure, ferrierite, erionite and mixtures thereof, a porous matrix material selected from silica, alumina, silica-alumina and mixtures thereof, which composition further comprises a dehydrogenating metal or metal component selected from platinum, palladium, nickel, cobalt, iron, tungsten, molybdenum and mixtures thereof and wherein the dehydrogenating metal or metal components is from about 0.5 to 20% wt, based on zeolite II, and the weight percentage of zeolite I to the sum of zeolite I and II ranges from about 0.1 to 30% wt.

* * * * *